US011897591B2

(12) United States Patent
Gonring (10) Patent No.: US 11,897,591 B2
(45) Date of Patent: *Feb. 13, 2024

(54) PCM CONTROLLED CHARGING SYSTEM (71) Applicant: Brunswick Corporation, Mettawa, IL (US)

(72) Inventor: Steven J. Gonring, Slinger, WI (US)

(73) Assignee: Brunswick Corporation, Mettawa, IL (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/099,334

(22) Filed: Nov. 16, 2020

(65) Prior Publication Data
US 2022/0009612 A1     Jan. 13, 2022

Related U.S. Application Data (63) Continuation-in-part of application No. 15/943,394, filed on Apr. 2, 2018, now Pat. No. 10,836,462, (Continued)

(51) Int. Cl.
B63H 21/14    (2006.01)
H02P 9/48     (2006.01)
(Continued)

(52) U.S. Cl.
CPC .............. B63H 21/14 (2013.01); H02J 4/00 (2013.01); H02J 7/1492 (2013.01); H02P 9/02 (2013.01);
(Continued)

(58) Field of Classification Search
CPC ...... B63H 21/14; B63H 21/21; B63H 21/213; H02J 7/1492; H02P 9/02; H02P 9/48
(Continued)

(56) References Cited

U.S. PATENT DOCUMENTS 5,216,350 A    6/1993  Judge et al.
5,460,555 A   10/1995  Fukuoka
(Continued)

FOREIGN PATENT DOCUMENTS

CA    1137347    12/1982
DE    3003907     8/1981
(Continued)

OTHER PUBLICATIONS

Extended European Search Report issued in Corresponding European Patent Application No. 21208194.7, dated Apr. 19, 2022.

Primary Examiner — Tuan C To
(74) Attorney, Agent, or Firm — Andrus Intellectual Property Law, LLP (57) ABSTRACT A marine propulsion system includes an engine effectuating rotation of an output shaft, a battery, an alternator having a rotor driven into rotation by the output shaft and that is configured to generate a charge output to the battery, a battery state of charge sensor configured to measure a battery charge value of the battery, and a control system. This control system is configured to receive a demand value and/or a temperature, receive the battery charge value from the battery state of charge sensor; and control the alternator to adjust the charge output based on at least one of the battery charge value and the demand value and/or temperature.

22 Claims, 9 Drawing Sheets

Related U.S. Application Data which is a continuation of application No. 15/403,950, filed on Jan. 11, 2017, now Pat. No. 9,975,619.

(51) Int. Cl.
*H02J 4/00* (2006.01)
*H02P 9/02* (2006.01)
*H02J 7/14* (2006.01)
*B63H 21/21* (2006.01)

(52) U.S. Cl.
CPC .............. *H02P 9/48* (2013.01); *B63H 21/21* (2013.01); *B63H 21/213* (2013.01)

(58) Field of Classification Search
USPC ............................................ 701/21
See application file for complete search history.

(56) References Cited

U.S. PATENT DOCUMENTS

| | | | |
|---|---|---|---|
| 5,481,178 A | 1/1996 | Wilcox et al. | |
| 5,524,581 A | 6/1996 | Rush, II | |
| 5,570,001 A | 10/1996 | Fenley | |
| 5,602,459 A | 2/1997 | Rogers | |
| 5,656,918 A * | 8/1997 | Pearman | H02J 7/1438 322/14 |
| 5,706,783 A | 1/1998 | Sawada | |
| 5,746,270 A | 5/1998 | Schroeder | |
| 5,870,991 A | 2/1999 | Mineno | |
| 5,955,793 A | 9/1999 | Khadkikar | |
| 6,273,771 B1 | 8/2001 | Buckley et al. | |
| 6,309,268 B1 | 10/2001 | Mabru | |
| 6,414,832 B1 | 7/2002 | Crecelius | |
| 6,652,330 B1 | 11/2003 | Wasilewski | |
| 7,122,993 B2 * | 10/2006 | Bauerle | H02J 7/14 322/61 |
| 7,503,819 B1 | 3/2009 | Jaeger | |
| 7,637,790 B1 * | 12/2009 | Guerra | B63H 20/14 440/6 |
| 7,812,467 B1 | 10/2010 | Lemancik et al. | |
| 7,941,253 B1 | 5/2011 | Brant | |
| 8,089,169 B2 * | 1/2012 | Maeda | H02J 7/0047 290/40 C |
| 8,137,146 B2 | 3/2012 | Cohen | |
| 8,454,402 B1 * | 6/2013 | Arbuckle | B63H 21/21 440/86 |
| 9,004,961 B1 | 4/2015 | French | |
| 9,371,074 B1 | 6/2016 | Luehrsen | |
| 9,545,985 B1 | 1/2017 | Provost | |
| 9,815,539 B1 | 11/2017 | Provost | |
| 9,889,752 B2 | 2/2018 | Zhou | |
| 9,975,619 B1 * | 5/2018 | Gonring | H02J 4/00 |
| 10,116,149 B1 | 10/2018 | Dao | |
| 2005/0009420 A1 | 1/2005 | Yoshida | |
| 2005/0287880 A1 | 12/2005 | Okuyama | |
| 2009/0061705 A1 | 3/2009 | Wilatrowski et al. | |
| 2009/0200993 A1 * | 8/2009 | Maeda | H02J 7/14 322/99 |
| 2009/0261599 A1 | 10/2009 | Alston et al. | |
| 2009/0269994 A1 * | 10/2009 | Alston | B63H 21/17 440/51 |
| 2010/0147257 A1 | 6/2010 | Yazaki et al. | |
| 2010/0174234 A1 | 7/2010 | Werp et al. | |
| 2012/0029749 A1 | 2/2012 | Ulrey | |
| 2012/0083173 A1 * | 4/2012 | McMillan | B63H 21/20 903/930 |
| 2012/0101671 A1 * | 4/2012 | Caouette | B63H 21/21 180/65.265 |
| 2012/0104768 A1 * | 5/2012 | Gibson | F02N 11/0814 290/36 R |
| 2013/0109255 A1 | 5/2013 | Agemura | |
| 2013/0218385 A1 | 8/2013 | Wenger | |
| 2014/0167707 A1 * | 6/2014 | Brunstetter | H02J 7/007194 320/162 |
| 2015/0005995 A1 | 1/2015 | Caouette | |
| 2016/0129981 A1 | 5/2016 | Davis | |
| 2016/0218518 A1 * | 7/2016 | Fukuda | H02J 5/00 |
| 2016/0332520 A1 | 11/2016 | Miller | |
| 2017/0028979 A1 | 2/2017 | Miyashita | |
| 2017/0194669 A1 * | 7/2017 | Christensen | H01M 10/615 |
| 2017/0217328 A1 * | 8/2017 | Patel | B60K 1/04 |
| 2018/0172137 A1 | 6/2018 | Yamazaki | |
| 2019/0074558 A1 * | 3/2019 | Masias | H01M 10/4264 |

FOREIGN PATENT DOCUMENTS

| | | | |
|---|---|---|---|
| DE | 19629833 | 1/1998 | |
| EP | 0655037 | 7/1996 | |
| EP | 2090507 A2 * | 8/2009 | ............ B63H 21/00 |
| EP | 2169819 | 3/2010 | |
| EP | 2453546 A1 * | 5/2012 | ............... B60L 1/02 |
| EP | 2765678 A2 * | 8/2014 | ............... H02J 7/00 |
| GB | 2401203 | 11/2004 | |
| KR | 20140062648 | 5/2014 | |
| WO | WO-2012169953 A1 * | 12/2012 | ............. B60L 50/66 |
| WO | WO-2014099526 A2 * | 6/2014 | ............. B60L 58/12 |
| WO | WO-2016138100 A1 * | 9/2016 | ............. B60R 16/03 |
| WO | WO 2010042190 | 4/2020 | |

\* cited by examiner

PCM CONTROLLED CHARGING SYSTEM

CROSS REFERENCE TO RELATED APPLICATION

This application is a continuation-in-part of U.S. patent application Ser. No. 15/943,394, filed Apr. 2, 2018, which is a continuation of U.S. patent application Ser. No. 15/403,950, filed Jan. 11, 2017 and published as U.S. Pat. No. 9,975,619 on May 22, 2018, the contents of which are hereby incorporated by reference in their entireties.

BACKGROUND

The following U.S. Patents and Applications provide background information and are incorporated herein by reference in entirety.

U.S. Pat. No. 5,481,178 discloses a circuit and method for controlling a switching voltage regulator having (1) a switch including one or more switching transistors and (2) an output adapted to supply current at a regulated voltage to a load including an output capacitor. The circuit and method generates a control signal to turn said one or more switching transistors OFF under operating conditions when the voltage at the output is capable of being maintained substantially at the regulated voltage by the charge on the output capacitor. Such a circuit and method increases the efficiency of the regulator circuit particularly at low average current levels.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 6,652,330 discloses a method for controlling the electrical system of a marine vessel that comprises the steps of measuring a battery potential, comparing the battery potential to a threshold voltage magnitude, and then disconnecting one or more of a plurality of electrical power consuming devices when the voltage potential is less than the threshold voltage magnitude. This is done to avoid the deleterious condition wherein an engine of the marine vessel is operating at idle speed and attempting to charge the battery while a plurality of electrical power consuming devices are operating and drawing sufficient current from the alternator to prevent the proper charging of the battery. In these circumstances, the battery potential can actually be depleted as the battery attempts to provide the additional required electrical current for the loads.

U.S. Pat. No. 7,812,467 discloses a smart alternator control circuit and method limiting alternator load on an internal combustion engine.

U.S. Pat. No. 7,941,253 discloses a marine propulsion drive-by-wire control system controls multiple marine engines, each one or more PCMs, propulsion control modules for controlling engine functions which may include steering or vessel vectoring. A helm has multiple ECUs, electronic control units, for controlling the multiple marine engines. A CAN, controller area network, bus connects the ECUs and PCMs with multiple PCM and ECU buses. The ECU buses are connected through respective isolation circuits isolating the respective ECU bus from spurious signals in another ECU bus.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a marine propulsion system includes an engine effectuating rotation of an output shaft at an engine output power, a battery, and an alternator having a rotor driven into rotation by the output shaft such that the alternator utilizes a portion of the engine output power to generate a charge current to the battery. The marine propulsion system includes a control system that receives a throttle demand value and determines whether the throttle demand value exceeds a demand threshold. The control system controls the alternator to reduce the charge current output to the battery and reduce the portion of the engine output power utilized by the alternator when the throttle demand value exceeds the demand threshold.

In one embodiment, a method of controlling an alternator in a marine propulsion system includes receiving a battery voltage level of a battery charged by the alternator, receiving a throttle demand value, determining whether the throttle demand value exceeds a demand threshold, and determining whether the battery voltage level exceeds a threshold minimum battery voltage. If the throttle demand value exceeds the demand threshold and the battery voltage level exceeds the threshold minimum battery voltage, then the alternator is controlled to reduce the charge current output to the battery and reduce engine output power utilized by the alternator.

Another embodiment of a marine propulsion system includes an engine effectuating rotation of an output shaft, a battery, an alternator having a rotor driven into rotation by the output shaft, and a temperature sensor that measures a temperature associated with the engine. The marine propulsion system further includes a control system that receives the temperature from the temperature sensor and determines whether the temperature exceeds a temperature threshold. If the temperature threshold is exceeded, then the control system controls the alternator to reduce the charge current output to the battery.

One embodiment of a method of controlling an alternator in a marine propulsion system includes receiving a temperature from a temperature sensor, wherein the temperature is at least one of an intake air temperature, an oil temperature, and a coolant temperature. The method includes determining whether the temperature exceeds a temperature threshold, and controlling the alternator to reduce the charge current output to the battery when the temperature exceeds the temperature threshold.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

As electrical demand in marine vessels increase, larger and larger capacity alternators are being utilized. For example, marine vessels have an ever increasing number of electronic devices for navigation and on-board computing, as well as an ever increasing number of accessory devices that require high current draw, such as stereo systems, large user interface displays, large bilge pumps, as well as electrical outlets to be utilized by passengers on the vessel. These higher capacity alternators provide sufficient charging output to the battery so that the various accessory devices can be operated effectively. However, through extensive experience and research in the relevant field, the inventor has recognized that such large capacity alternators have an unintended consequence of reducing the available horse power output from the engine for driving the propeller to propel the marine vessel. Another problem recognized by the inventor is that the higher capacity alternators produce significant heat that can contribute to overheating of the engine.

In view of his recognition of foregoing problems and challenges, the inventor developed the disclosed marine propulsion system utilizing a method of controlling an alternator based on at least one of a battery charge value, such as a battery state of charge, a demand threshold on the engine, and an engine-related temperature measurement, such as a temperature measurement from a temperature sensor under the cowl. The inventor recognized that the alternator can be controlled to reduce the charging output to the battery, such as turning off the charging output altogether, during peak demand in order to increase the amount of power available to propel the marine vessel.

Figure 2:
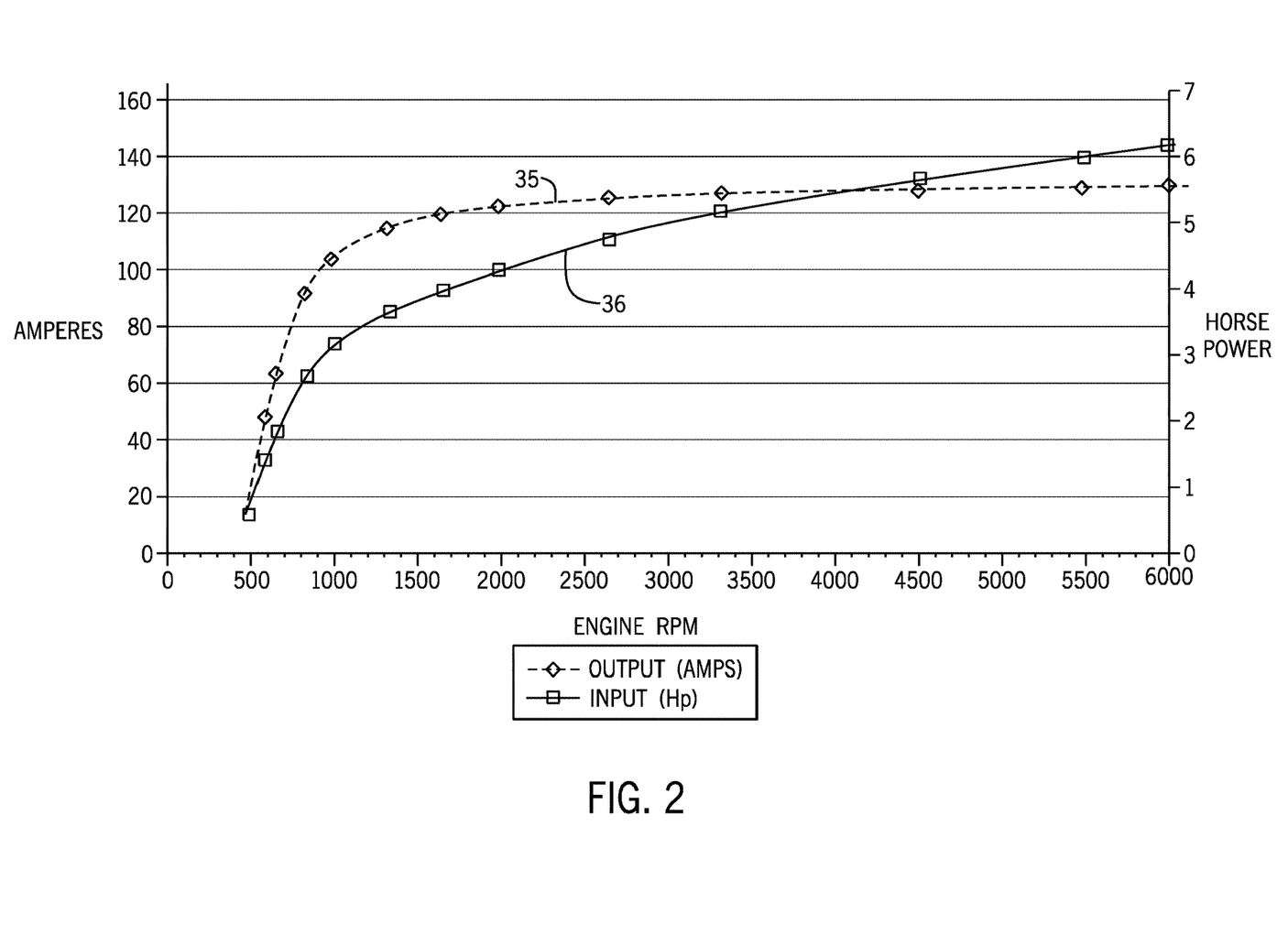
FIG. 2 is a graph depicting horse power consumption and charging current output for an exemplary alternator.

FIG. 2 provides a graph showing a charging output to a battery and a corresponding power consumption for an exemplary alternator. Line 35 depicts an exemplary charging current output from an alternator to a battery based on engine RPM, and specifically charging output in amperes from the exemplary alternator at a range of engine RPM from 500 RPM (exemplary idle setpoint) to about 6,000 RPM (exemplary maximum engine RPM). The dashed line 36 represents a corresponding horsepower consumption of the exemplary alternator at the same range of RPMs. In the depicted example, the alternator consumes approximately 0.5 horsepower at idle and consumes about 6.25 horsepower at maximum engine RPM.

The inventor has recognized that some or all of the horsepower consumed by the alternator could be better utilized during peak power demand to allow more power to be delivered to the propeller, such as during heavy acceleration demand or when operating at wide open throttle. This may be especially valuable at higher engine RPMs, where an increasing amount of horse power is consumed with little gain in charging output to the battery. Accordingly, the inventor developed an alternator control algorithm that utilizes demand values, such as a throttle demand value determined by a throttle lever position or engine RPM setpoint, as control inputs to reduce the horsepower consumed by the alternator during peak demand times. If maximum power output is being requested by the operator, such as during hard acceleration or maximum throttle demand, the charge output of the alternator (i.e., the current output from the alternator to the battery) can be reduced resulting in less load on the engine from the alternator and more power available to propel the marine vessel. For example, the charge setpoint, which is the voltage for controlling the alternator, may be adjusted to the charge output from the alternator to the battery to make power available to propel the marine vessel. Such control may be provided based on a demand value (such as the throttle demand from the operator), as well as based on a battery charge value, such as a battery voltage level or a state of charge of the battery. For example, if the battery voltage level drops below a threshold minimum battery voltage during a high power demand event, the voltage for controlling the alternator may be gradually increased to maintain the battery voltage at or above the threshold minimum battery voltage. When the power demanded by the operator decreases, such as below a demand threshold, the voltage may be gradually increased back to its normal state. Alternatively or additionally, the voltage for controlling the alternator may be reduced for a period of time upon detection of a high throttle demand from the operator, and thus the alternator may return to normal operation after expiration of the predetermined period of time.

Additionally or alternatively, the charge output of the alternator may be controlled by an alternator setpoint, which can be a value, alternator setting, or instruction communicable to the alternator to dictate the amount of charge current outputted by the alternator. Such control may be provided based on the demand value, as well as based on a battery charge value, such as a battery voltage level or a state of charge of the battery. For example, if the battery state of charge drops below a threshold minimum battery charge during a high power demand event, the alternator setpoint for controlling the output of the alternator may be controlled to maintain the battery charge state of charge at or above the threshold minimum battery charge but dedicate as much horsepower as possible to propelling the vessel. When the power demanded by the operator decreases, such as below a demand threshold, the alternator setpoint may be gradually increased back to its normal running state. Alternatively or additionally, the alternator setpoint for controlling the alternator may be reduced for a period of time upon detection of a high throttle demand from the operator, and thus the alternator may return to normal operation after expiration of the predetermined period of time.

Additionally, the inventor also recognized that the alternator can be controlled to increase performance and engine protection functions by allowing the alternator output to be reduced when the under-cowl temperature conditions are high such that additional heat outputted by the alternator can have deleterious effects. Accordingly, the inventor also developed an alternator control algorithm utilizes temperature measurement, such as engine temperature or air temperature to control the alternator to reduce the alternator output when the temperatures are above an acceptable threshold temperature, thereby to create less heat from the alternator during high under-cowl ambient conditions.

Figure 1:
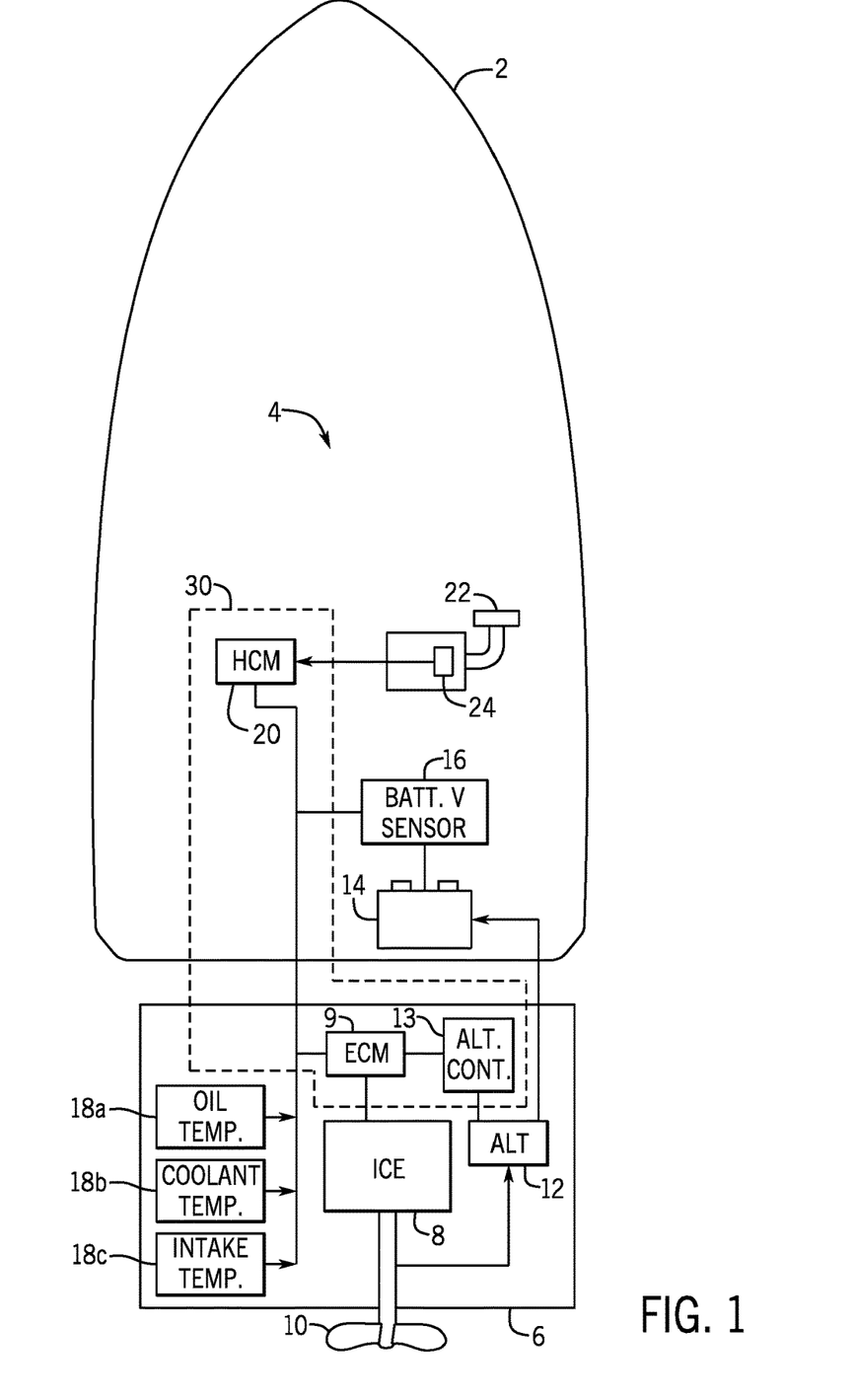
FIG. 1 is a schematic diagram of a marine propulsion system according to one embodiment of the present disclosure.

FIG. 1 depicts an exemplary embodiment of a marine propulsion system 4 configured to provide the alternator control functionality described herein. In the depicted embodiment, a propulsion device 6 propels the marine vessel 2. While the propulsion device 6 is depicted as an outboard motor, in other embodiments the propulsion device 6 may be any device that propels the marine vessel, such as an inboard drive, inboard/outboard drive, stern drive, jet drive, or the like. The propulsion device 6 includes an engine 8, such as an internal combustion engine, and an engine control module (ECM) 9 that monitors and controls the engine 8. The engine 8 drives rotation of the propulsor 10, such as a propeller or impeller, in order to propel the marine vessel 2 through the water. The propulsion device 6 further includes one or more temperature sensors 18, which in the depicted embodiment include an oil temperature sensor 18a, coolant temperature sensor 18b, and intake air temperature sensor 18c sensing the temperature of the air entering the intake manifold of the engine 8.

In addition to driving the propulsor 10 to propel the marine vessel 2, the engine 8 output also drives the alternator 12 which converts the rotational motion outputted by the engine 8 into electrical energy to charge the battery 14, which in turn powers the engine (such as at startup) as well as other accessory devices described above. For example, the crank shaft of the engine 8 may drive the rotor of the alternator 12, e.g., by a pulley belt, to generate electrical energy for charging the battery and/or for use by the engine 8. As is typical, the alternator has a stator supplying output power through output diodes. Some of the output power is supplied back to the alternator in order to generate a field current, enabling generation of electrical energy upon rotation of the rotor. Accordingly, the alternator causes a load on the engine that absorbs horsepower from the engine output, as depicted in FIG. 2. In general, the greater the engine RPM, the faster that the rotor is turned and thus the greater the amount of horsepower utilized by the alternator 12. Therefore, the alternator 12 outputs more current to charge the battery 14 at higher engine RPMs. However, the load on the engine also correlates to the field current, and thus reducing the field current also reduces the amount of engine output power consumed by the alternator.

The alternator 12 is controlled by an alternator controller 13, which may provide digital and/or analog control of the alternator to adjust the charge output from the alternator. In one embodiment, the alternator controller 13 may be a smart alternator control circuit responsive to another control module, such as the ECM 9 and/or the helm control module (HCM). The alternator controller 13 controls the amount of load that the alternator 12 puts on the engine 8 by limiting the charge current output to the battery 14 from the alternator 12. Specifically, the alternator controller 13 limits the load imposed by the magnetic field on the rotor by reducing the field current supplied as feedback to the alternator 12. Thereby, the amount of horsepower absorbed by the alternator 12 is reduced, as is the charge current outputted by the alternator 12. The alternator controller 13 is may be configured to control the alternator 12 based on the voltage level of the battery 14, such as the voltage measured by a battery state of charge sensor configured as a battery voltage sensor 16. In such an embodiment, the alternator controller 13 may be configured to maintain the battery voltage level within a predetermined amount of a voltage setpoint. Some embodiments can be configured to control the alternator 12 based on a different battery state of charge value. For example, a battery state of charge sensor can be configured to measure a state of charge of the battery using a coulomb counting method, which measures the current flowing into and out of battery 14 to determine the a level of charge of the battery 14. For example, the battery state of charge sensor may be a MasterShunt 500 by Power Products, LLC of Menomonee Falls, WI, USA and/or an Intelligent Battery Sensor by Hella GmbH & Co. KGaA of Lippstadt, Germany. While battery state of charge sensor configured to measure a battery state of charge were known at the time of the invention, the inventor has recognized that battery state of charge measurements can be used by an alternator controller to selectively adjust the charge current output of the alternator.

The propulsion system 4 further includes one or more propulsion control devices, such as a throttle lever 22 utilized to control the speed of the marine vessel 2. As is standard, the throttle lever 22 is movable in a forward direction to increase the speed of the marine vessel. A lever position sensor 24 senses a position of the throttle lever 22 and communicates the position to a control module, which in the depicted embodiment is a helm control module (HCM) 20. The throttle lever 22 is movable between a neutral position (such as commanding that a gear system of the propulsion device 6 is in neutral) and a full throttle forward position. This range of motion of the throttle lever 22 may be expressed as a percentage, for example, between 0% associated with the neutral position and 100% associated with the full forward throttle position of the throttle lever 22.

Accordingly, an operator provides a throttle demand input to the system by moving the throttle lever 22. A high throttle demand may be determined by comparing the position of the throttle lever 22 to a threshold throttle position requiring high horsepower output, such as higher than the available horsepower output when the alternator 12 is consuming a significant amount of horsepower. For example, the demand threshold may be a threshold lever position, such as a throttle lever position above 90% or above 95%. In other embodiments, the demand threshold may be set higher or lower depending on the overall configuration of the system 4.

Alternatively or additionally, the demand threshold may be defined as a threshold increase in throttle lever position. For example, if the operator moves the throttle lever 22 forward rapidly, demanding quick acceleration of the marine vessel 2, the portion of the engine output power utilized by the alternator may be reduced in order to divert more horsepower to accelerating the marine vessel 2. Accordingly, the demand threshold may be a threshold increase in the position of the throttle lever 22 in a given amount of time, above which the output of the alternator 12 is reduced. For example, the helm control module 20 may determine the derivative, or change, between two or more consecutive throttle lever positions measured by the lever position sensor 24 to determine a rate of change of the throttle lever 22. That rate of change may be compared to a threshold rate of change in order to determine whether the throttle demand value exceeds the demand threshold. To provide just one example, the demand threshold may be 50% of the total forward throttle range (between 0% and 100% forward throttle lever position) per second. If the throttle demand exceeds the threshold, then the alternator 12 is controlled as described herein.

In other embodiments, the throttle demand value may be some other value associated with the throttle demanded by the operator, or by an autopilot control module controlling propulsion of the marine vessel 2. For example, the throttle demand value may be an engine RPM setpoint associated with the throttle lever 22 position and/or determined by an autopilot system. Likewise, the demand threshold may be an engine RPM setpoint value against which the demand threshold engine RPM setpoint can be compared. Similarly, the demand threshold may be a threshold increase in engine RPM setpoint. In such an embodiment, a change in engine RPM setpoint over a predetermined time period may be calculated. If a sudden acceleration is demanded then the change in engine RPM setpoint will suddenly increase. If the increase in engine RPM setpoint exceeds the threshold, then the alternator reduction strategy described herein will be employed.

In still other embodiments, the throttle demand value and corresponding demand threshold may be any other value representing the demand on the engine 8, such as engine load, the amount of output power demanded, percent of available power demanded, or the like.

The alternator control strategy is implemented by a control system on the marine vessel 2 which may include one or more control modules or other control circuitry. In the depicted embodiment, the control system 30 includes the HCM 20, ECM 9, and alternator controller 13. The HCM 20, alternator controller 13, and ECM 9 are communicatively connected such that control signals can be communicated therebetween. For example, the control modules 20, 13, 9 of the control system 30 may be operating as a CAN network, such as exemplified in U.S. Pat. No. 6,273,771. In other embodiments, the modules in the control system 30 may operate as a Local Interconnect Network (LIN) bus. In still other embodiments, communication between the ECM 9 and HCM 20 may be via CAN bus protocols, and communication to the alternator controller 13 from the other control modules 9, 20 may be via a LIN bus communication protocol and/or a CAN bus communication protocol (for example). In still other embodiments, the control modules within the control system 30 may communicate via wireless communication, which may be by any of various available wireless communication protocols.

The systems and methods described herein may be implemented with one or more computer programs executed by one or more processors, which may all operate as part of a single control system 30, or even a single control module comprising the control system 30. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As used herein, the term control module may refer to, be part of, or include an application-specific integrated circuit (ASIC), an electronic circuit, a combinational logic circuit, a field programmable gate array (FPGA), a processor (shared, dedicated, or group) that executes code, or other suitable components that provide the described functionality, or a combination of some or all of the above, such as in a system-on-chip. The term module may include memory (shared, dedicated, or group) that stores code executed by the processor. The term code, as used herein, may include software, firmware, and/or microcode, and may refer to programs, routines, functions, classes, and/or objects. The term shared, as used above, means that some or all code from multiple modules may be executed using a single (shared) processor. In addition, some or all code to be executed by multiple different processors may be stored by a single (shared) memory. The term group, as used above, means that some or all code comprising part of a single module may be executed using a group of processors. Likewise, some or all code comprising a single module may be stored using a group of memories.

Figure 3:
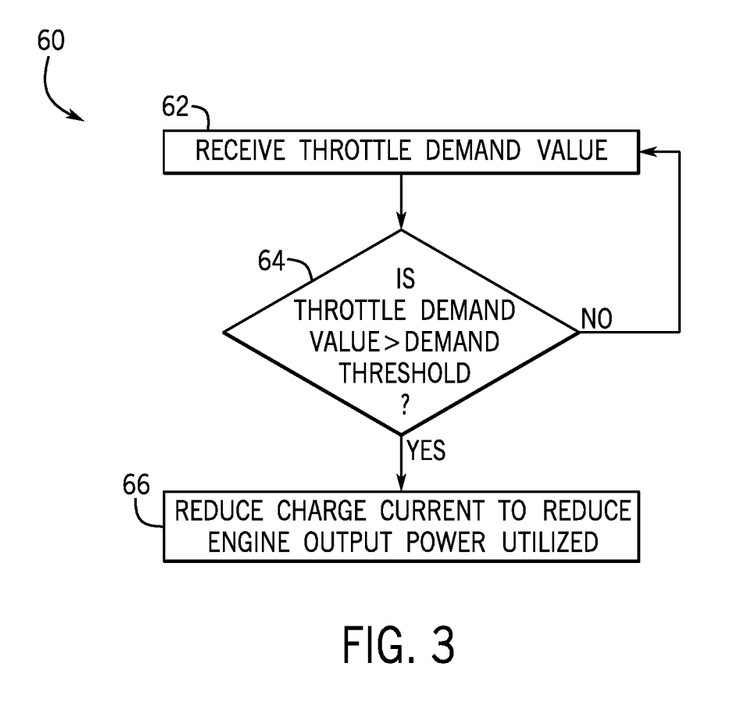
FIGS. 3-9 depict various embodiments of methods of controlling an alternator in a marine propulsion system.
Figure 4:
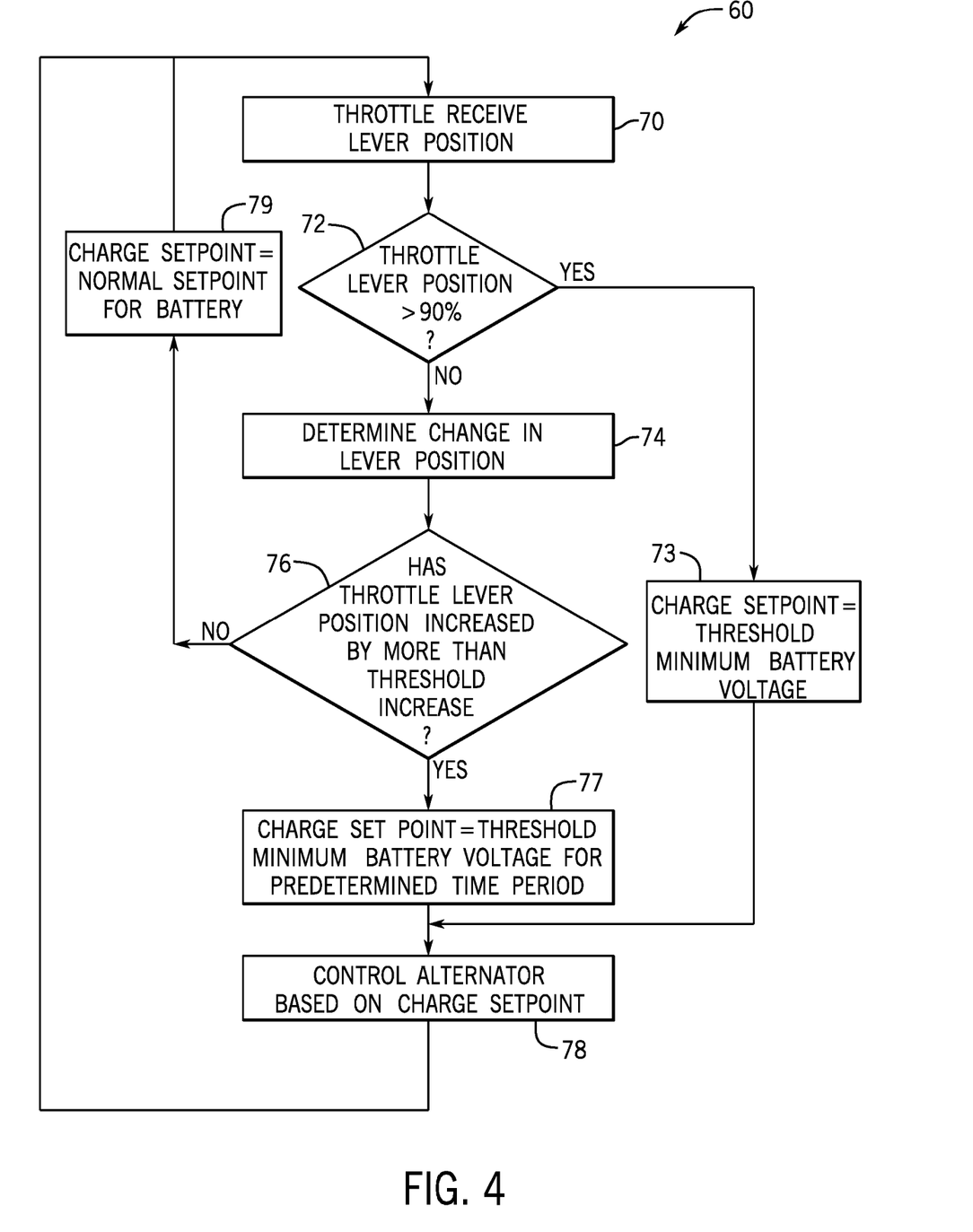
Figure 5:
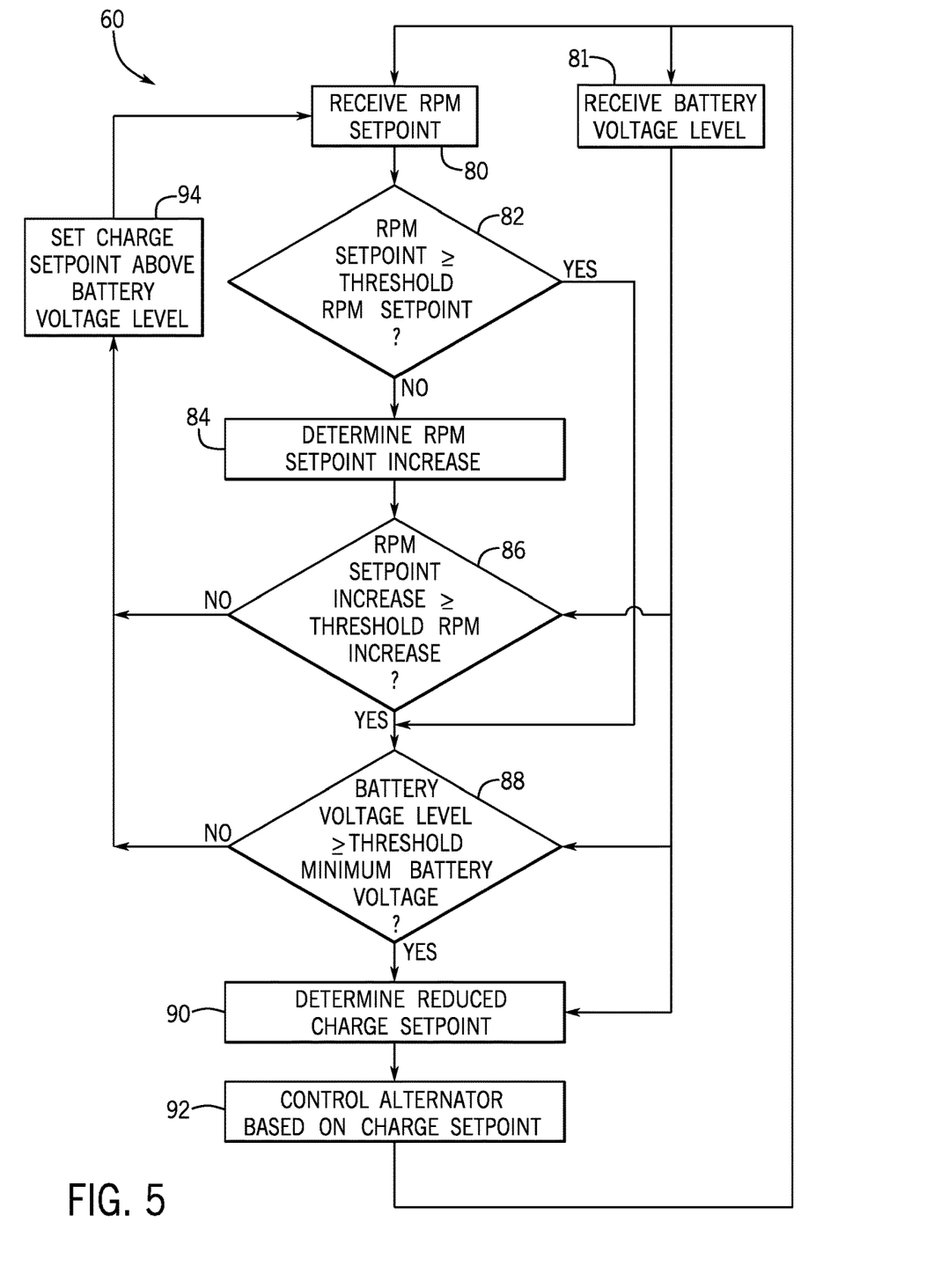

FIGS. 3-7 represent various embodiments of a method 60 of controlling an alternator 12 to reduce engine output power utilized by the alternator when the throttle demand value exceeds the demand threshold. FIGS. 3-5 provide exemplary embodiments of methods 60 of controlling the alternator 12 based on throttle demand value. In FIG. 3, a demand value, such as a throttle demand value, is received at step 62. Steps are executed at step 64 to determine whether the throttle demand value exceeds the demand threshold. If not, then no action is taken and the throttle demand value continues to be monitored. Once the throttle demand value exceeds the demand threshold, the charge current output from the alternator 12 is reduced at step 66 to reduce the engine output utilized by the alternator 12. In some embodiments the charge output from the alternator may be adjusted to a predetermined value associated with the demand value, or an adjusted charge output may be determined based on a comparison of the demand value to the demand threshold. Exemplary embodiments of the method depicted at FIG. 3 are provided at FIGS. 4 and 5.

Figure 6:
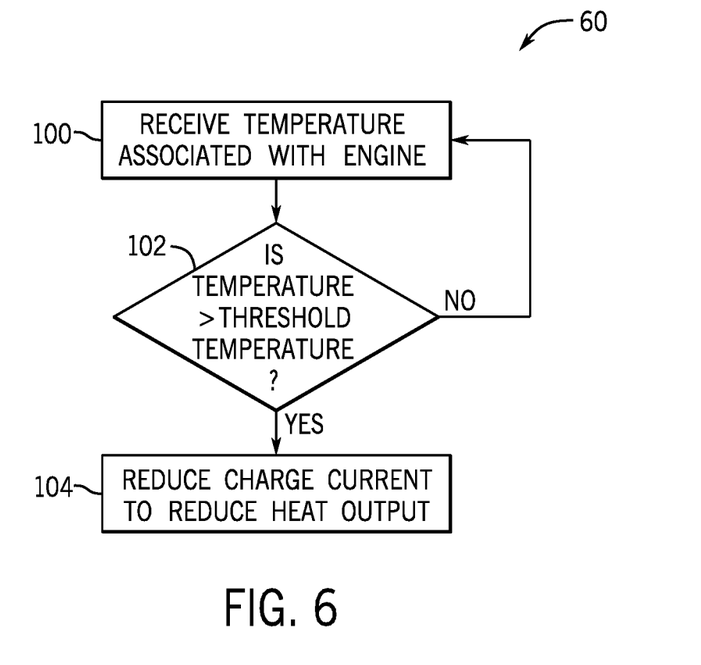
Figure 7:
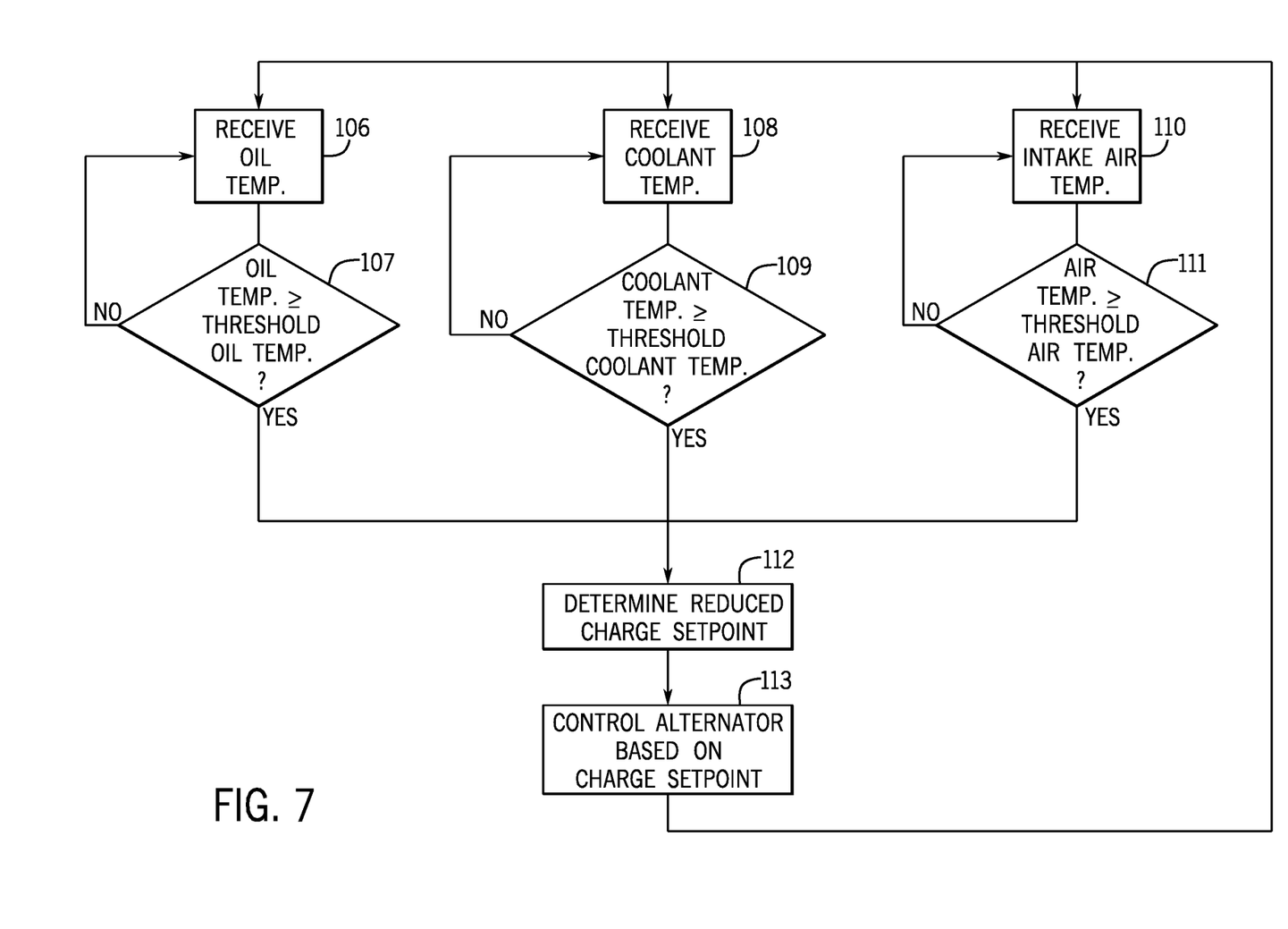

FIG. 6 provides another exemplary method 60 of controlling an alternator in a marine propulsion system 4. A temperature associated with the engine is received at step 100 and is compared to a threshold temperature at step 102. If the threshold temperature is exceeded, then the charge current outputted by the alternator 12 is reduced at step 104 to reduce heat output by the alternator. For example, the field current supplied to the alternator 12 may be reduced to zero, thereby reducing the charge current outputted by the alternator 12 to zero and significantly reducing the heat generated by the alternator 12. In some embodiments, the charge output may be adjusted to a non-zero value based on a comparison of the temperature to the threshold temperature. FIG. 7 depicts another embodiment of the method generally depicted and described at FIG. 6.

The methods depicted at FIGS. 3-7 are carried out by the marine propulsion system 4 according to instruction generated by the control system 30. As described above, the control system 30 may include one or more control modules comprising executable instructions that carry out the steps described herein. In various embodiments of the control system 30, the instructions may be variously divided among one or more control modules, which in the depicted exemplary embodiment include the ECM 9, HCM 20, and alternator controller 13.

FIG. 4 depicts an embodiment of a method 60 of controlling an alternator 12 in the marine propulsion system 4 based on throttle demand. A demand value, such as a throttle lever position, is received at step 70. For example, a position measurement may be received by the HCM 20 from the lever position sensor 24 associated with the throttle lever 22. The throttle lever position is compared to a threshold throttle lever position at step 72, which in the depicted embodiment is 90%. If the threshold throttle lever position is greater than 90%, then step 73 is executed to reduce the charge output by setting the charge setpoint equal to a threshold minimum battery voltage. Namely, the charge setpoint for controlling the battery voltage is set at a threshold minimum causing the alternator to reduce its charge current output, perhaps to zero, until such time as the battery charge value, such as the battery voltage level or a battery state of charge value, reaches the threshold minimum battery charge.

Alternatively, the charge output may be reduced by controlling the alternator setpoint to reduce the amount of charge current outputted by the alternator 12 and/or reduce the portion of engine output power from the engine 8 that is utilized by the alternator 12. The alternator setpoint or the charge setpoint may be adjusted to a value other than that associated with the threshold minimum battery charge when a demand value exceeds the demand threshold. In some embodiments, the alternator setpoint or charge setpoint may be adjusted to an adjusted setpoint between the normal charging setpoint and the setpoint associated with the threshold minimum battery charge level. The adjusted alternator or charge setpoint can be calculated based on, for example, a ratio of the demand value and the demand threshold. For example, if the throttle demand value exceeds the demand threshold, a reduced alternator or charge setpoint can be calculated based on how much the demand value exceeds the demand threshold. If the demand value well exceeds the demand threshold, then the alternator setpoint or charge setpoint may be set at or near the threshold minimum battery voltage. Conversely, if the demand value barely exceeds the threshold, the alternator or charge setpoint may be only slightly reduced. Thus, the magnitude of the reduction in the alternator setpoint or charge setpoint can correspond to the magnitude of the demand value and/or a difference between the demand value and the demand threshold. The method then continues to step 78.

If the throttle lever position (or another demand value) does not exceed the 90% demand threshold at step 72, then a change in lever position is determined at step 74. For example, the current throttle lever position received at step 70 may be compared to one or more previously-received throttle lever positions to determine an amount that the throttle lever position has changed and/or a rate of change. Instructions are executed at step 76 to determine whether the throttle lever position has increased by more than the threshold increase. Similarly, instructions may be executed to determine whether the rate of change of the throttle lever exceeds a threshold rate of change in the positive, accelerating, direction. If the threshold increase is not exceeded at step 76 then the control system 30 executes step 79, where the charge setpoint, is set equal to the normal charge set point for the battery, and thus the alternator 12 resumes or continues its normal charging operation. The system then returns to step 70 to continue to monitor the throttle lever position.

If the threshold throttle lever is exceeded, then steps are executed at step 77 to adjust the charge output from the alternator, for example, by making the charge setpoint equal to the threshold minimum battery voltage. In the exemplary embodiment, the charge setpoint is made equal to the threshold minimum battery voltage for a predetermined period of time. For example, the predetermined period of time may be a preset time period that correlates with the amount of time estimated for the engine RPM to reach the demanded engine RPM—namely, for the marine vessel to reach the demanded speed corresponding to the throttle lever position. For example, the predetermined time period may be determined by accessing a lookup table of time periods based on the throttle lever position increase. In another embodiment, the predetermined time period may be a single set time period for which the alternator is turned off in order to divert additional horsepower to the propeller during the initial period of acceleration. Additionally or alternatively, the length of the time period may be determined based on a comparison between the demand value and the demand threshold. For example, the length of the time period can be calculated based on a ratio of the demand value and the demand threshold. When the demand value is slightly exceeded the charge output may be reduced for a short length of time, and when the demand value is significantly exceeded the charge output may be reduced for an extended length of time.

The alternator is then controlled based on the adjusted charge setpoint (or an adjusted alternator setpoint). Accordingly, the charge current output from the alternator 12 to the battery 14 is reduced until such time as the predetermined time period has expired, the battery voltage level reaches the threshold minimum battery voltage, or the throttle demand no longer exceeds the relevant thresholds.

FIG. 5 depicts another embodiment of a method 60 of controlling an alternator 12 in a marine propulsion system 4. An RPM setpoint is received at step 80, such as an RPM setpoint associated with the current position of the throttle lever 22 as measured by the lever position sensor 24. For example, the position may be received by the HCM 20 from the lever position sensor 24, and the HCM may determine the engine RPM setpoint associated with the received throttle lever position. A battery charge value (such as a voltage level) is also received at step 81, such as from the battery voltage sensor 16 (or any other type of battery state of charge sensor). Instructions are executed at step 82 to determine whether the engine RPM setpoint received at step 80 is greater than or equal to the demand threshold, which is a threshold RPM setpoint. To provide just one example, the threshold engine RPM setpoint could be a value equal to 90% of the maximum RPM of the engine 8. If the threshold engine RPM setpoint is exceeded then the system continues to step 88.

If not, then instructions are executed at step 84 to determine an engine RPM setpoint increase, such as by comparing the received engine RPM setpoint to previously-received engine RPM setpoints. The engine RPM setpoint increase is then compared to a threshold engine RPM increase at step 86. If the demand threshold is exceeded then the system continues to execute step 88. If the demand threshold is not exceeded then the charge setpoint is set to a value that is greater than the battery voltage level, such as to the normal setpoint for maintaining the battery 14. The control system 30 then continues to monitor the engine RPM setpoint to see if the aforementioned thresholds are exceeded.

At step 88, instructions are executed to determine whether the battery voltage level received at step 81 from the battery voltage sensor 16 exceeds a threshold minimum battery voltage. The minimum battery charge threshold, such as voltage threshold, is a battery charge value below which the charge current output of the alternator 12 to the battery 14 will not be reduced in order to divert horsepower to turning the propulsor 10. To provide just one example, the threshold minimum battery voltage may be set to 12 volts. Preferably, the threshold minimum battery voltage is a value above the amount of battery power needed to start the engine 8, such as if the engine were to stall or be turned off during the execution of this method. If the battery voltage is not greater than the threshold minimum battery voltage, then step 94 is executed to set the charge setpoint above the battery voltage level, thus to provide a charge current output from the alternator 12 to charge the battery 14.

Assuming that the battery charge value, such as voltage level, is greater than the threshold minimum battery charge, then an adjusted charge setpoint or an adjusted alternator setpoint is determined at step 90. In various embodiments, for example, the adjusted charge setpoint may be a predetermined value, such as the threshold minimum battery voltage or zero volts, or it may be a value determined based on the battery charge level and/or the throttle demand value. For example, a reduced charge setpoint may be established based on the magnitude of the throttle demand value and/or the difference between the throttle demand value and the demand threshold.

For example, if the throttle demand value well exceeds the demand threshold then the charge setpoint might be set low, such as to the threshold minimum battery voltage or to zero volts. Conversely, if the throttle demand value barely exceeds the threshold, the reduced charge setpoint might be set at or below the current battery voltage level received at step 81. In that situation, the charging output of the alternator 12 would be reduced or eliminated briefly, but would soon resume once the battery charge level decreased a bit. In still other embodiments, the reduced charge setpoint may be set to a predetermined amount below the current battery voltage level.

The alternator 12 is then controlled based on the adjusted charge setpoint or alternator setpoint based on step 92. For example, the adjusted charge setpoint may be determined at either the ECM 9 or the HCM 20, and then communicated to the alternator controller 13, which controls the alternator based on the received adjusted setpoint.

FIGS. 6 and 7 depict an embodiment of the method 60 for controlling the alternator 12 based on temperature under the cowl. FIG. 6 is discussed above. In the embodiment depicted in FIG. 7, three different temperature values are received and compared to respective threshold temperatures. Oil temperatures are received at step 106, such as from oil temperature sensor 18*a*. The oil temperature is then compared to a threshold oil temperature at step 107. Coolant temperature is received at step 108, such as from coolant temperature sensor 18*b*, and then compared to a threshold coolant temperature at step 109. Intake air temperature is then received at step 110, such as from intake temperature sensor 18*c*, and then compared to a threshold intake air temperature at step 111. If any of the threshold oil temperature, threshold coolant temperature, or threshold intake air temperature is exceeded, then a reduced charge setpoint (or a reduced alternator setpoint) is determined at step 112. As described above, the reduced charge setpoint may be a predetermined setpoint value, or it may be determined based on the offending temperature measurement and/or the current battery voltage level (or any other battery charge value). In one embodiment, the adjusted charge setpoint may be set equal to zero volts, such as to turn off the field current delivered to the alternator 12 and minimize the heat generated by the alternator activity. Thereby, the alternator will not contribute to the high under-cowl temperature. The alternator is then controlled based on the adjusted charge setpoint at step 113

As previously discussed, a battery state of charge sensor can be configured to measure a battery charge value other than the voltage of the battery. It should be appreciated that a control system 30 can be configured to control the output charge of an alternator based on battery state of charge measurements obtained by the battery sensor 16. For example, the output charge may be adjusted in response to the battery charge value moving below a minimum battery charge threshold. Additionally or alternatively, the control system can adjust the charge output as a function of the battery charge value's proximity the minimum battery charge threshold. In such an embodiment, even while a demand value exceeds the demand threshold, a reduced charge output may be gradually increased as the battery charge value approaches the minimum battery charge threshold.

While many of the forging examples describe controlling a charge output from the alternator by adjusting a charge setpoint of the alternator, some embodiments may be configured to control an alternator using an adjusted alternator setpoint. For example, embodiments for a control system including a control module 9 that communicates with the alternator controller 13 via a CAN bus or a LIN bus may be configured to control charge output by controlling a setting of the alternator, or alternator setpoint, to achieve the desired charge output. For instance, the charge output may be controllable by communicating a desired output charge current to the alternator controller.

Figure 8:
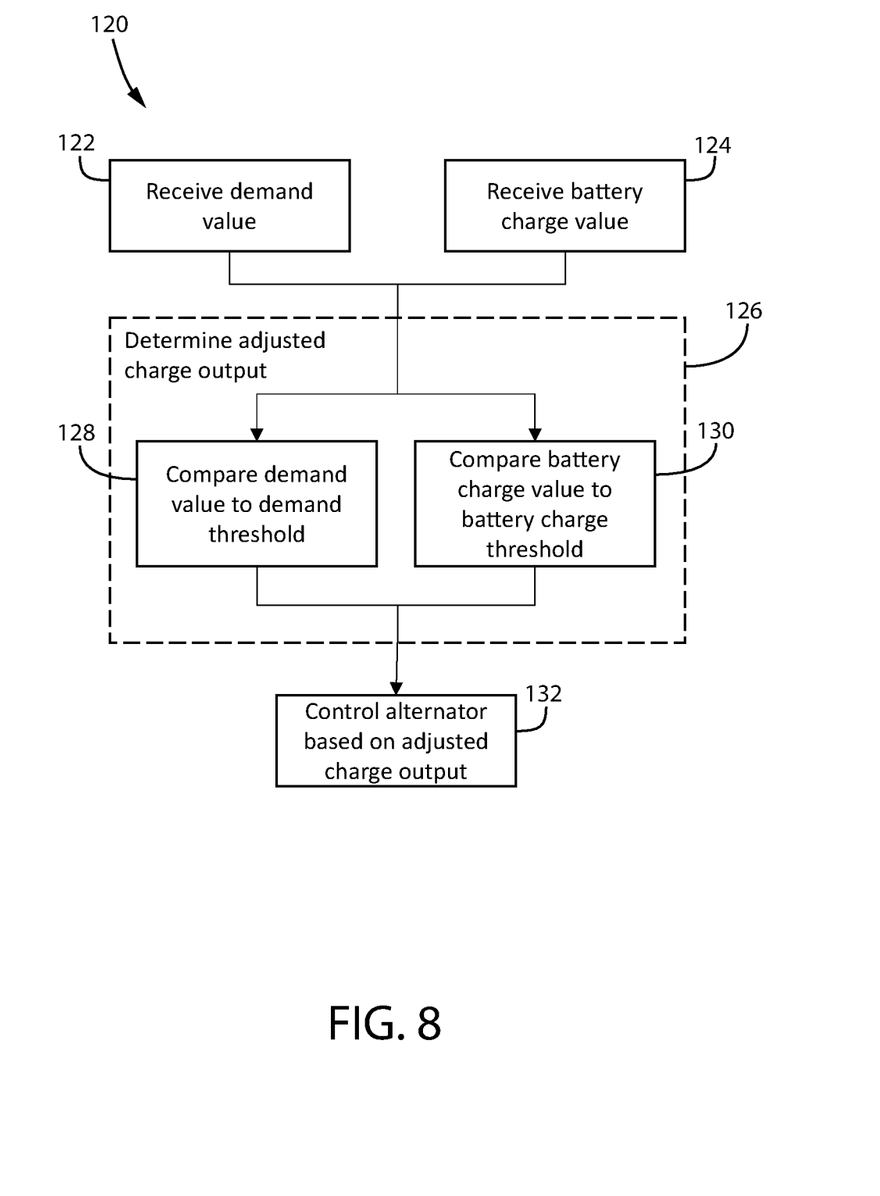

FIG. 8 illustrates an embodiment of a method 120 for controlling an alternator 12 to generate a charge output to a battery 14. At steps 122 and 124, the control system may receive a demand value and a battery charge value. The demand value received at step 122 may be at least one of a throttle demand value, an RPM set point, or any other demand value for the marine propulsion system. The battery charge value received at step 124 may be at least one of a battery state of charge value, a battery voltage, and any other measurement of the battery's level of charge.

After receiving the demand value and the battery charge value, the control system can perform the step 126 of determining an adjusted charge output based on the demand value and the battery charge value. The adjusted charge output may be a predetermined value that is associated with at least one of the demand value and the battery charge value (e.g., a value selected from a lookup table), or it may be calculated based on at least one of the demand value and the battery charge value. In some embodiments, for example, the step 126 of determining an adjusted charge output may include comparing the demand value to a demand threshold at step 128. The demand threshold may be a predetermined demand value or a threshold increase in the demand value. Some embodiments may include a step for comparing a demand value to a predetermined threshold demand value and comparing an increase in the demand value to threshold increase in the demand value. The control system may then calculate the adjusted charge output based on the comparison (or comparisons) between the demand value and the demand threshold. For example, if the demand value exceeds a demand threshold, the charge output from the alternator may be reduced. The adjusted charge output may be a predetermined value, or it may be calculated based on the measured demand value. For example, the adjusted charge output may be based on a ratio of the demand value and the demand threshold.

Additionally or alternatively, the step 126 of determining the adjusted charge output may include a step 130 for comparing the battery charge value to a battery charge threshold. This may include, for example, comparing the battery charge value to a minimum battery charge threshold and calculating the charge output based on the comparison between the battery charge value and the minimum battery threshold. The battery charge threshold may also be compared to a different battery charge threshold associated with a level of battery charge between the minimum battery charge and a full charge.

Some embodiments of the step 126 for determining the adjusted charge output may include calculating the adjusted charge output based on a comparison between the demand value and the demand threshold and the comparison between the battery charge value and a battery charge threshold. An adjusted charge output may first be determined based on the demand value before being further adjusted based on the battery charge value. For example, an adjusted charge output that was reduced based on a comparison between the demand value and the demand threshold may be further adjusted based on a comparison between the battery charge value and a battery charge threshold. When the battery charge value is at or below the minimum battery charge threshold (which can be the minimum battery charge level required to start the vehicle), the adjusted charge output may be returned to the default charge output in order to increase the battery charge level.

Once an adjusted charge output is determined in step 126, the alternator 12 may be controlled based on the adjusted charge output in step 132. Controlling the alternator 12 may include at least one of reducing the charge output current from the alternator 12 to the battery 14, increasing the charge output, and increasing or decreasing the charge output for a specified length of time. For example, the control system may be configured to adjust the charge output based on the demand value and the battery charge value until there is a change in at least one of the demand value and the battery charge value. The charge output may alternatively be adjusted for a predetermined length of time before returning to the default charge output. To effect a change in the charge output, step 132 may include steps for communicating control instructions from a control module 9 to an alternator controller 13. This may include at least one of communicating an adjusted charge setpoint and communicating an adjusted alternator setpoint to the alternator controller. The adjusted alternator setpoint and the adjusted charge setpoint may be determined as part of the step 126 for determining an adjusted charge output, as part of the step 132 for controlling the alternator, or as a separate, intermediate step.

Figure 9:
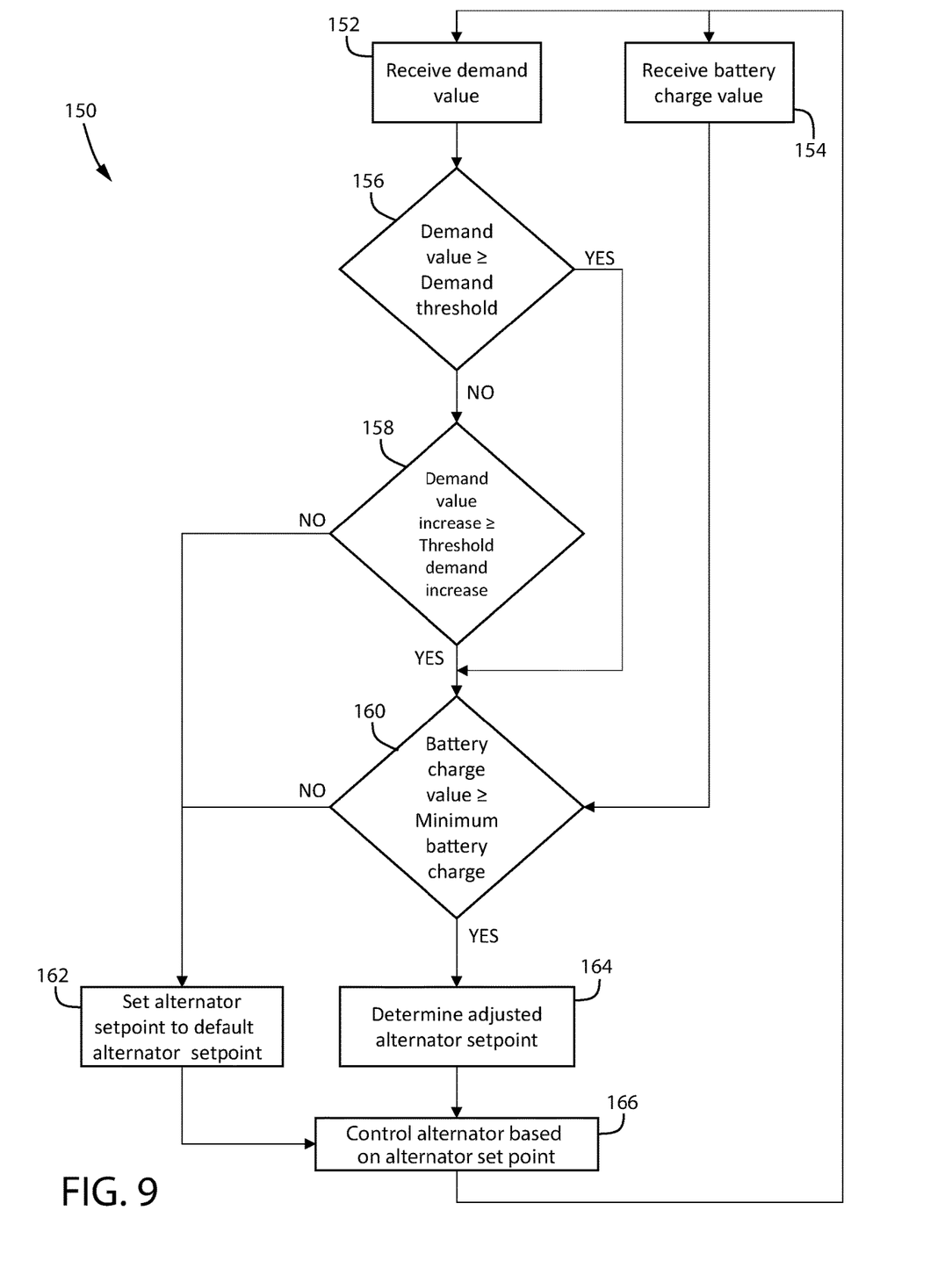

Referring now to FIG. 9, another embodiment of a method 150 for controlling an alternator 12 to generate a charge output is illustrated. The method may begin with the reception of a demand value, such as a throttle demand value, and RPM setpoint, or any other value, by the control system at step 152. A battery charge value, such as a battery voltage or another battery state of charge measurement, is also received at step 154. The control system may then be configured to compare the demand value to a demand threshold. In the illustrated embodiment, for example, the demand value is compared to a demand threshold to determine if the demand value is at or above the predetermined demand threshold.

If the measured demand value is equal to or greater than the demand threshold, the control system may be configured to move to step 160 for comparing the battery charge value to a battery charge threshold. However, if the measured demand value does not exceed the demand threshold, then an increase in the demand value can be compared to a threshold demand increase at step 158. The demand value increase may be calculated based on previously received demand values. If the calculated demand increase is not equal to or greater than the threshold demand increase, the alternator setpoint may be set to a default alternator setpoint (which may be associated with the normal charge output for maintaining the battery) at step 162. If the threshold demand increase is exceeded, then the system may continue to execute step 160.

In the illustrated embodiment, the control system is configured to skip the step 158 for comparing a demand value increase to a threshold demand increase if the demand value exceeds the first demand threshold. Some embodiments, however, can be configured to perform step 158 even when the demand value exceeds the demand threshold.

After the demand values have been compared to the corresponding demand thresholds, the control system may be configured to compare the measured battery charge value to a battery charge threshold at step 160. The battery charge value may be measured by a battery charge sensor 16 and can be any value that indicates the current level of charge in the battery, such as a battery voltage or a battery state of charge. In the illustrated embodiment, the control system is configured to determine if the battery state of charge value is below a threshold minimum state of charge. If the battery state of charge is below the minimum battery charge threshold, the alternator setpoint can be set to a default alternator setpoint at step 162.

If the control system determines that the battery charge value is greater than the minimum battery charge threshold, the adjusted alternator setpoint can be determined at step 164. The adjusted alternator setpoint may be based on at least one of the demand value, the battery charge value, a comparison between the demand value and a demand threshold, and the comparison between the battery charge value and a battery charge threshold. The adjusted alternator setpoint may be a predetermined value, or it may be calculated based on the demand value and/or the battery charge value. For example, the adjusted alternator setpoint may be a predetermined value selected from a lookup table based on at least one of the battery charge value and the demand value. Alternatively, the adjusted alternator setpoint may be calculated at step 164 based on a comparison between the demand value and the demand threshold. If the demand value is significantly higher than the demand threshold, then the adjusted alternator setpoint may be set significantly lower than the default alternator setpoint. Conversely, if the demand value is only slightly larger than the demand threshold, the adjusted alternator setpoint may only be slightly reduced than the default setpoint. Additionally or alternatively, the alternator setpoint may calculated as a function of both the demand value and the battery charge value. For example, the alternator setpoint may first be adjusted based on a ratio of the demand value and the demand threshold before being further adjusted based on a comparison between the battery charge value and the minimum battery charge threshold.

Once an adjusted alternator setpoint has been determined, the alternator 12 can then be controlled based on the adjusted alternator setpoint at step 166. The adjusted alternator setpoint may be communicated to the alternator controller 13 via a CAN bus, a LIN bus, or any other communication protocol. Once the adjusted alternator setpoint has been received, the alternator controller 13 may increase or decrease the charge output from the alternator 12 to the battery 14. For example, based on the provided instructions, the charge output may be reduced for a specified amount of time. The length of time of the charge output reduction may be a predetermined value, or it may be based on at least one of the demand value and the battery charge value. The alternator controller 13 may also be configured to hold the charge output at an adjusted level until an additional alternator setpoint is received.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

I claim:

1. A marine propulsion system comprising:
an engine effectuating rotation of an output shaft;
a battery;

an alternator having a rotor driven into rotation by the output shaft and that is configured to generate a charge output to the battery;
a battery state of charge sensor configured to output a battery charge value of the battery;
a control system configured to:
receive a demand value and/or a temperature, wherein the temperature includes at least one of an under-cowl air temperature, an oil temperature, or a coolant temperature;
receive the battery charge value from the battery state of charge sensor; and
control the alternator to adjust the charge output based on at least one of the battery charge value and the demand value and/or the temperature.

2. The marine propulsion system of claim 1, wherein the battery charge value is a battery state of charge.

3. The marine propulsion system of claim 2, wherein the battery state of charge sensor comprises a voltage sensor and the battery charge value is a battery voltage level.

4. The marine propulsion system of claim 2, wherein the battery state of charge sensor is configured to calculate the battery state of charge using coulomb counting.

5. The marine propulsion system of claim 1, wherein the control system is configured to control the alternator to adjust the charge output value by least one of reducing a charge current output to the battery and reducing a portion of engine output power from the engine that is utilized by the alternator.

6. The marine propulsion system of claim 1, wherein the control system is configured to control the alternator by determining an adjusted charge setpoint and communicating the adjusted charge setpoint to an alternator controller.

7. The marine propulsion system of claim 1, wherein the control system is configured to control the alternator by determining an adjusted alternator setpoint and communicating the adjusted alternator setpoint to an alternator controller.

8. A marine propulsion system comprising:
an engine effectuating rotation of an output shaft;
a battery;
an alternator having a rotor driven into rotation by the output shaft and that is configured to generate a charge output to the battery;
a control module configured to:
receive a demand value;
determine an adjusted alternator setpoint based on the demand value; and
communicate the adjusted alternator setpoint to an alternator controller for the alternator such that the alternator generates the charge output to the battery based on the adjusted alternator setpoint.

9. The marine propulsion system of claim 8, wherein the control module is configured to communicate the adjusted alternator setpoint to the alternator controller via at least one of a CAN bus communication protocol and a LIN bus communication protocol.

10. The marine propulsion system of claim 8, wherein the adjusted alternator setpoint is a predetermined value associated with the demand value.

11. The marine propulsion system of claim 8, wherein the adjusted alternator setpoint is a predetermined value associated with a threshold increase in the demand value.

12. The marine propulsion system of claim 8, wherein the adjusted alternator setpoint is further based on a comparison between a battery charge value and a minimum battery charge threshold.

13. The marine propulsion system of claim 8, wherein the adjusted alternator setpoint is further based on at least one of a magnitude of the demand value and a difference between the demand value and a demand threshold.

14. A method of controlling an alternator configured to generate a charge output to a battery in a marine propulsion system, the method comprising:
receiving a battery charge value of a battery charged by the alternator;
receiving a demand value;
determining an adjusted charge output based on the demand value and the battery charge value; and
controlling the alternator based on the adjusted charge output to reduce at least one of the charge output to the battery and an engine output power utilized by the alternator.

15. The method of claim 14, further comprising comparing the demand value to a demand threshold, and wherein determining the adjusted charge output based on the demand value includes determining the adjusted charge output based on the comparison.

16. The method of claim 15, wherein determining the adjusted charge output includes calculating the adjusted charge output based on a ratio of the demand value and the demand threshold.

17. The method of claim 15, further comprising comparing the battery charge value to a minimum battery charge threshold, and wherein the adjusted charge output is further determined based on the comparison.

18. The method of claim 14, wherein determining the adjusted charge output is further based on a comparison between the battery charge value and a battery charge threshold.

19. The method of claim 14, wherein controlling the alternator based on the adjusted charge output comprises adjusting the charge output to the battery for a length of time based on a comparison between the demand value and a demand threshold.

20. The method of claim 19, wherein the demand value is a lever position of a throttle lever, and the demand threshold is a threshold increase in throttle lever position.

21. The method of claim 14, wherein controlling the alternator based on the adjusted charge output comprises communicating an adjusted charge setpoint to an alternator controller controlling the alternator.

22. The method of claim 14, wherein controlling the alternator based on the adjusted charge output comprises communicating an adjusted alternator setpoint to an alternator controller.

* * * * *